United States Patent [19]

Johnson et al.

[11] Patent Number: 4,707,339
[45] Date of Patent: Nov. 17, 1987

[54] HIGH-PRESSURE MIXING HEAD

[75] Inventors: Vincent L. Johnson, Seabrook, Tex.; Kurt Moser, Lindau, Fed. Rep. of Germany

[73] Assignee: The Dow Chemical Company, Midland, Mich.

[21] Appl. No.: 513,705

[22] Filed: Jul. 14, 1983

Related U.S. Application Data

[63] Continuation of Ser. No. 315,071, Oct. 26, 1981, Pat. No. 4,418,041.

[30] Foreign Application Priority Data

Oct. 30, 1980 [DE] Fed. Rep. of Germany ....... 3040922

[51] Int. Cl.$^4$ .......................... B01F 5/04; B01F 15/02
[52] U.S. Cl. .................................... 422/133; 366/159; 366/173
[58] Field of Search ................ 422/131, 133; 366/159, 366/173; 137/625.4, 625.48; 251/285

[56] References Cited

U.S. PATENT DOCUMENTS

| | | | |
|---|---|---|---|
| 4,070,008 | 1/1978 | Schlieckmann | 366/159 |
| 4,418,041 | 11/1983 | Johnson et al. | 366/159 |
| 4,464,056 | 8/1984 | Schmitz et al. | 422/131 |
| 4,497,579 | 2/1985 | Schmitz et al. | 422/131 |

FOREIGN PATENT DOCUMENTS 2065841 12/1975 Fed. Rep. of Germany .

Primary Examiner—David L. Lacey
Attorney, Agent, or Firm—St. Onge Steward Johnston & Reens

[57] ABSTRACT

Disclosed is a high-pressure mixing head for the mixing of at least two reactive plastics material components and the foaming of these components, the mixing head comprises a mixing chamber (18) which has opening thereinto nozzle orifices (22; 24; 41) for the plastics material components and a blowing agent, and in which a metering plunger (20) is mounted for reciprocating movement. The mixing chamber (18) opens into a discharge section (16) of greater dimensions which, thus, acts as a stabilizing zone. On the mixing chamber outlet (26), a variable damper element (purging plunger 12; damping plunger 40) is provided which provides for variable restriction of the mixing chamber outlet (26). The damper element greatly reduces the mixing turbulence within the mixing chamber, such that, in combination with the discharge section of greater dimensions, the plastic foam mixture flows out from the mixing head so smoothly that spatter-free foaming even in open molds becomes possible.

10 Claims, 7 Drawing Figures

HIGH-PRESSURE MIXING HEAD

This is a Continuation, of application Ser. No. 315,071, filed Oct. 26, 1981 now U.S. Pat. No. 4,418,041.

The present invention relates to a high-pressure mixing head for the mixing of at least two reactive plastics material components and the foaming of these components, comprising a mixing chamber which has opening thereinto nozzle orifices associated with said plastics material components and a blowing agent, a metering plunger adapted to be reciprocated within said mixing chamber, and a cleaning or purging plunger adapted to be reciprocated within a discharge section extending approximately normal with respect to said mixing chamber and joining the latter.

A mixing head of this type has proved to be highly advantageous inasmuch as a kind of premixing operation under high mixing turbulence takes place in the mixing chamber proper, while an after-mixing operation under somewhat more stabilized flow conditions is effected within the outlet portion joining the mixing chamber.

Now, at first there had to be solved the object of improving a mixing head of this type in such a manner as to obtain further increased mixing turbulence within the mixing chamber, while almost fully stabilizing or steadying the flow prior to its exit from the mixing head or discharge section.

In the mixing head according to laid-open German patent application no. 26 12 812 —which distinguishes itself from the abovementioned mixing head by the feature that the outlet portion does not extend normal to the mixing chamber, but rather in the direction of the mixing chamber—this object is solved in that the outlet portion, as a stabilizing zone, is of greater dimensions than the mixing chamber, and that a variable damper element (damping plunger) is provided in the mixing chamber outlet.

With this construction, the advantages of the premixing within the mixing chamber under high mixing turbulence and of the after-mixing with stabilized flow in the outlet portion are fully retained; however, further increased mixing turbulence is obtained by the mixing chamber being of minimum dimensions. This extremely high mixing turbulence within the mixing chamber is greatly reduced by the damping means positioned at the outlet of the mixing chamber, such that an almost complete stabilization of the flow takes place within the subsequently disposed discharge section which is of greater dimensions than the mixing chamber; which stabilization is promoted by the greater dimensions of the discharge section. The mixture flows out from the mixing head so smoothly that it can readily be foamed also without enclosure (i.e. within an open mold).

In this construction, the above-described effect may be obtained even with a variation within a rather wide range of the injection pressure through the component nozzles.

The high mixing turbulence which is concentrated within the mixing chamber provides for intimate mixing of the first injected component particles with the last injected component particles. This results in the advantage of a direct processing or foaming even with intricate materials and with mixing ratios varying greatly from a ratio of 1:1.

The inventors made it their object to further improve a mixing head of the type as outlined above in such a way that the mixing head is of simple construction, but nevertheless may be adjusted in highly efficient manner to various materials, injection pressures, etc., in a particularly expedient fashion.

This object is solved by the construction of the mixing head as set forth herein.

In this construction, auxiliary plungers or the like are not required for damping the mixing turbulence. The purging plunger assumes a double function, namely the cleaning or purging of the outlet portion and a variable damping action in which the free end of the purging plunger opens the mixing chamber to a greater or lesser extent.

Preferably, the purging plunger comprises a double acting piston (head) adapted to be subjected to pressure on opposite sides within a cylinder housing, such that the plunger, depending on the pressure acting upon this piston, is adapted to be moved to its extended working position or to its retracted rest or home position in which the mixing chamber outlet is at least in part released or opened. In this structure, the location of rest position (limit) stop is adjusted to achieve the variable damping action preferably by an adjusting piston or plunger adapted to be threaded into the cylinder housing. At the same time, this adjusting piston or plunger defines the end face of the cylinder housing opposite from the discharge section.

The threading depth or position of the adjusting piston may be fixed readily by means of a lock bolt adapted to be threaded into the same threads provided in the cylinder housing, or by means of a setscrew positioned in the sidewall of the cylinder housing, or similar means. In order to vary the position of the adjusting piston, the lock bolt or setscrew must be untightened.

If the position of the adjusting piston is to be varied in the course of a production period, the adjusting piston may be connected to, for example, a stepping motor. In this way, the position of the adjusting piston may be varied during production; for example, when different discharge volumes are expelled successively in two shots with the aid of a corresponding device. Expediently, the adjustment or variation is effected automatically by means of the machine control system.

Alternatively, the damping means according to the invention may be formed by a throttling or damping plunger being adapted to be moved, independently of the purging plunger, to a position immediately in front of or within the mixing chamber outlet to thereby restrict the crosssection of the mixing chamber outlet. This solution is of particular advantage when the blowing agent nozzle (orifice) directed into the mixing chamber is integrated in the damping plunger. In this way, a highly compact structure is obtained in which the blowing agent nozzle has a dual function.

In order to be able to adjust the damping effect to the abovementioned parameters (injection pressure, type of the injected plastic components, etc.), the stop limiting the movement of the damping plunger to or into the mixing chamber outlet is preferably adapted to be continuously varied in its position.

However, the variation of the length of travel of the damping plunger may be effected also by exchanging the stop for a different one.

For the control of the rest-position terminal point of the damping plunger, the latter expediently cooperates with an electric limit switch. The same applies to the rest-position terminal point control of the abovementioned purging plunger.

Below, preferred embodiments of the invention are explained in greater detail by referring to the accompanying drawings, wherein.

It is to be noted that corresponding parts of the mixing head are identified by the same reference numerals in all figures.

Figure 1:
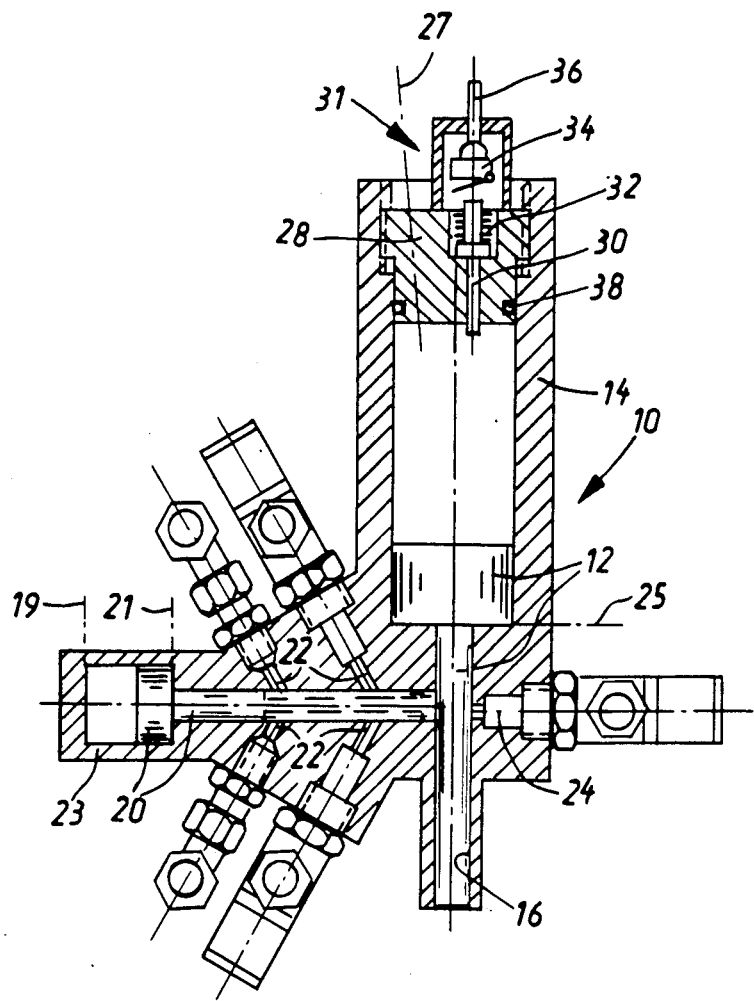
FIGS. 1 to 3 are sectional view of a first embodiment of a high-pressure mixing head, showing various positions of the cleaning or purging plunger.
Figure 2:
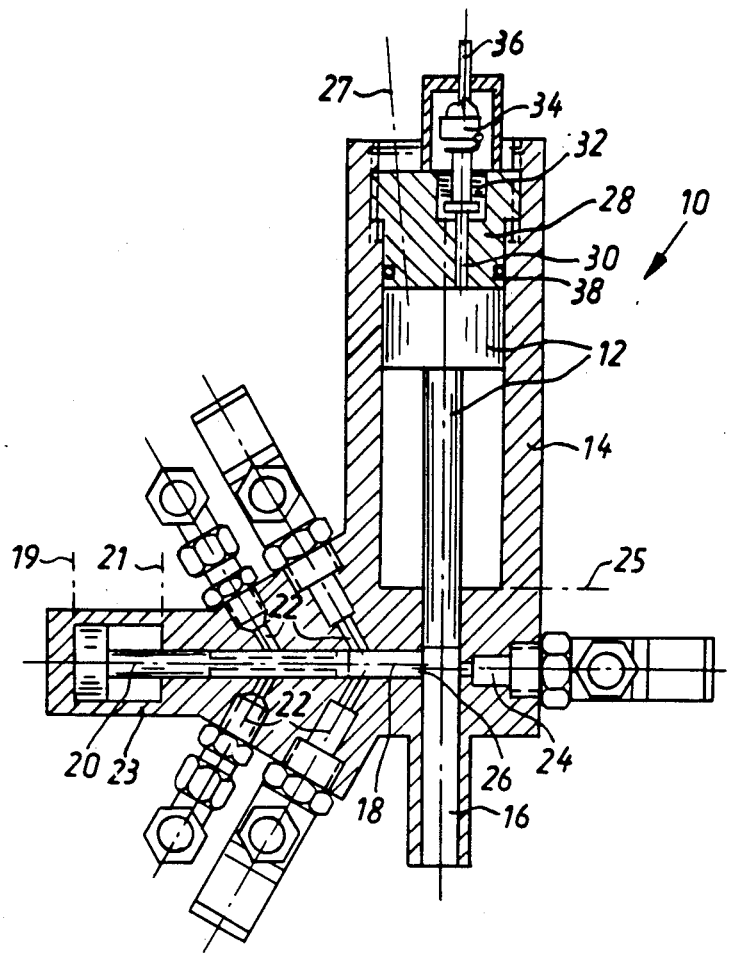
Figure 3:
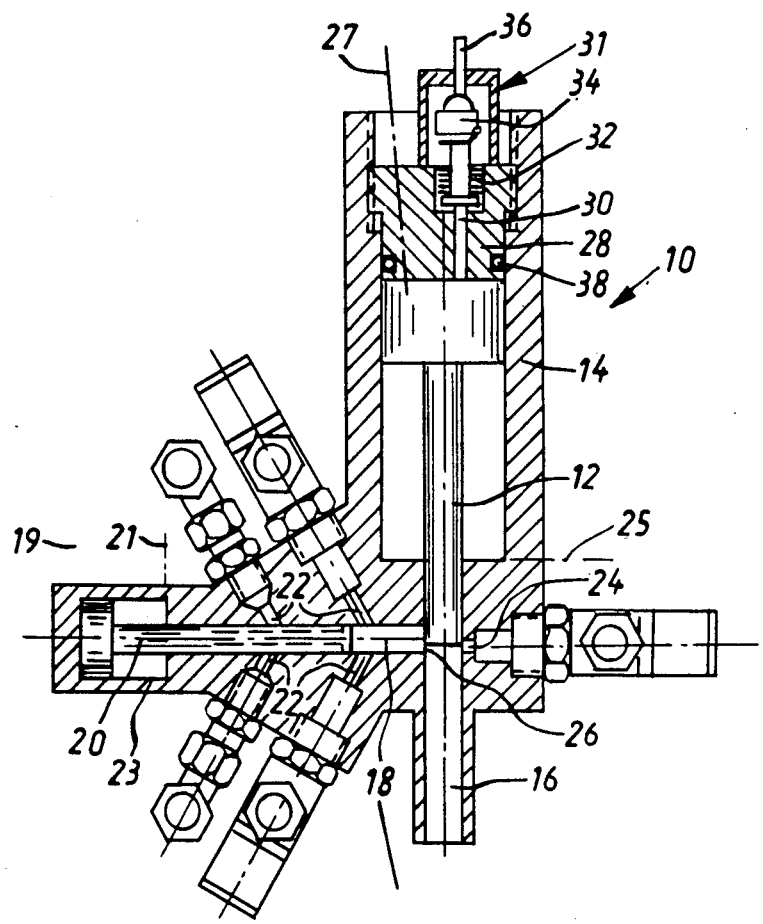

The mixing head shown in FIGS. 1 to 3 includes a horizontally extending mixing chamber 18 which has opening thereinto a pair of plastic component nozzle orifices 22 and a pair of connections for the circulation return flow. A metering plunger 20 is reciprocatingly movable within the mixing chamber 18, with the left hand end of the metering plunger according to FIGS. 1 to 3 being provided with a double-acting piston (head) for driving the metering plunger. Pressure is supplied to the metering plunger piston via a pair of hydraulic or similar lines 19, 21 opening into the cylinder housing 23. The mixing chamber 18 opens, via a mixing chamber outlet 26, into a discharge section 16 extending normal to the mixing chamber 18 and having reciprocatingly positioned therein a cleaning or purging plunger 12. At the end of the purging plunger 12 opposite from the discharge section 16, there is likewise provided a double-acting piston (head) which is mounted for longitudinal movement within a cylinder housing 14. Pressure is supplied to the purging plunger piston via hydraulic or similar lines 25, 27 opening into the cylinder housing 14.

As appears from FIGS. 1 to 3, the discharge section 16 is of somewhat greater dimensions than the mixing chamber 18; more particularly, the free cross-sectional area of the discharge section 16 is greater than that of the mixing chamber 18. In a position opposing or facing the mixing chamber outlet 26, a blowing agent nozzle (orifice) 24 opens into the discharge section 16.

In FIG. 1, the metering plunger 20 is in its ejecting position, while the purging plunger 12 is in its extended working position. In this position, the free end of the purging plunger is flush with the end face of the discharge section 16. In this way, it is secured that all residues are expelled from the discharge section 16 by the purging plunger 12.

According to FIG. 2, both the metering plunger 20 and the purging plunger 12 are shown in their home or rest positions. The rest position of the purging plunger 12 is defined by an adjusting piston 28 adapted to be threaded into the cylinder housing 14. The adjusting piston 28 at the same time forms the end face of the cylinder housing 14 opposite the discharge section 16, with the sealing of the cylinder space to the ambient being effected by a sealing ring 38 (O-ring) placed between the inner side of the sidewall of the cylinder housing 14 and the adjusting piston 28.

As can be seen from a comparison of FIGS. 2 and 3, the adjusting piston 28 may be threaded to various depths into the cylinder housing 14. The rest position of the purging plunger 12 thus may be varied correspondingly. In FIG. 2, the adjusting piston 28 is threaded into the cylindrical housing 14 to such extent that the free end of the purging plunger 12 fully releases the mixing chamber outlet 26 in the rest position or fully retracted position.

According to FIG. 3, however, the adjusting piston 28 has been threaded slightly deeper into the cylinder housing 14, such that the free end of the purging plunger 12, in the rest position thereof, releases or opens only a part of the mixing chamber outlet 26. In this way, a throttling or damping effect is created during the outflow of the plastic components mixed with each other within the mixing chamber 18, thereby greatly reducing the mixing turbulence. Of course, care must be taken in the embodiment according to FIGS. 1 to 3 that the adjusting piston 28 is not threaded too far into the cylinder housing 14, because this would involve the danger that the free end of the purging plunger blocks the blowing agent nozzle (orifice) 24 in its rest position.

Figure 4:
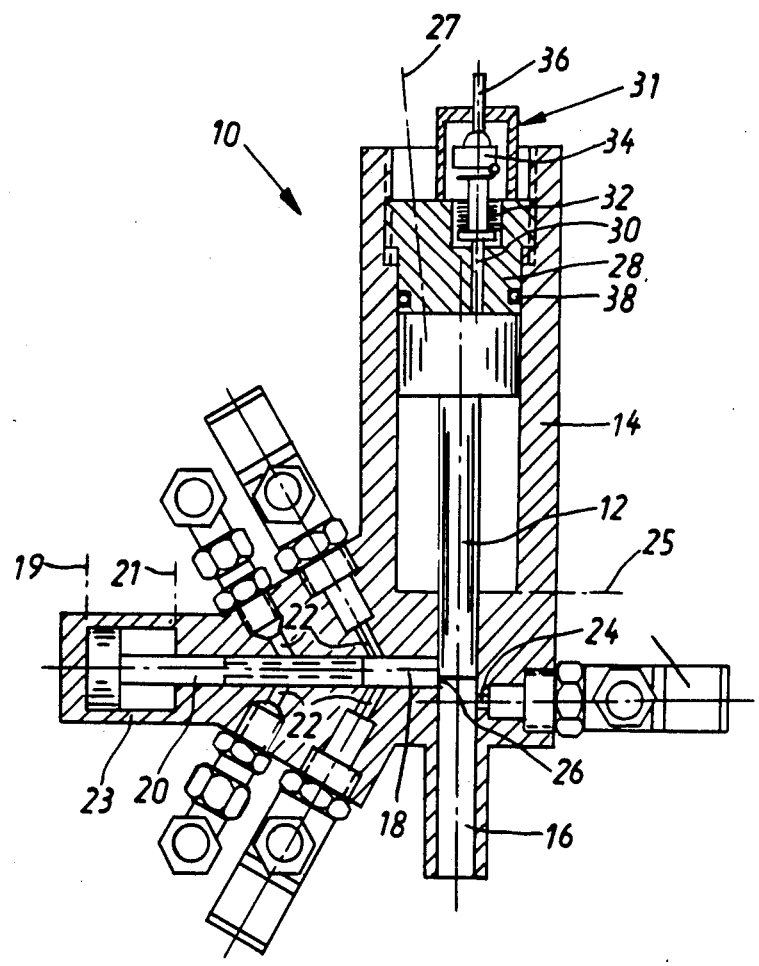
FIG. 4 is a sectional view of a second embodiment of a high-pressure mixing head with its purging plunger in the home or rest position.

In order to preclude this risk, in the embodiment according to FIG. 4 the blowing agent nozzle 24 is slightly displaced downwards, i.e. in the direction of the discharge opening of the discharge section 16. In other respects, the embodiment according to FIG. 4 is identical to the mixing head 10 of FIGS. 1 to 3 both in construction and in function.

Further, a limit switch 31 is positioned in the adjusting piston 28, which switch acts to control the end point or terminal position of the purging plunger 12. The limit switch 31 which does not form part of the present invention, includes a switching stud 30 cooperating with the piston (head) of the purging plunger 12 and being adapted to be moved upwards by the piston of the purging plunger 12 against the force of a compression spring 32, said switching stud cooperating with an electric limit pushbutton or detector which is connected to a corresponding control device of the overall system through an electric line.

The limit switch 31 provides for exact initiation of the foaming period and for exact control of the metering plunger.

In the structure according to FIGS. 1 to 4, the adjusting piston 28 may be adjusted manually. The position of the adjusting piston may be easily fixed with the aid of a not illustrated lock bolt or the like.

In order to allow for variation in the course of production, the adjusting piston 28 may be coupled to a stepping drive mechanism, whereby the operation of the overall system is greatly facilitated.

Figure 5:
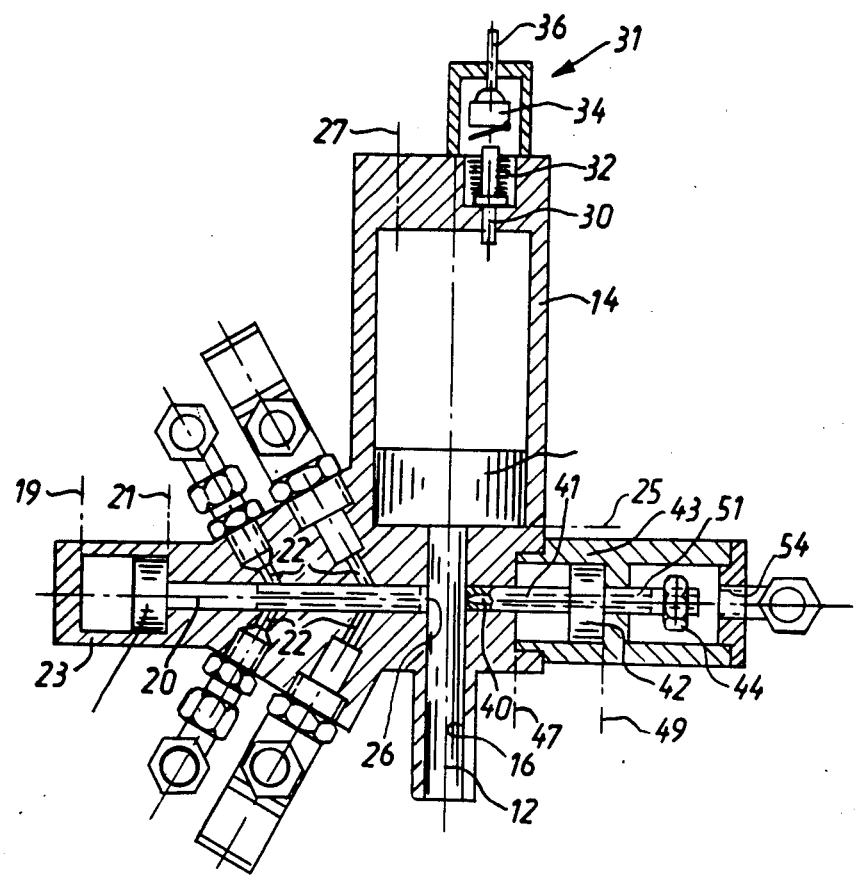
FIGS. 5 to 7 are sectional views of a third embodiment of a high-pressure mixing head, showing various positions of the purging plunger.
Figure 6:
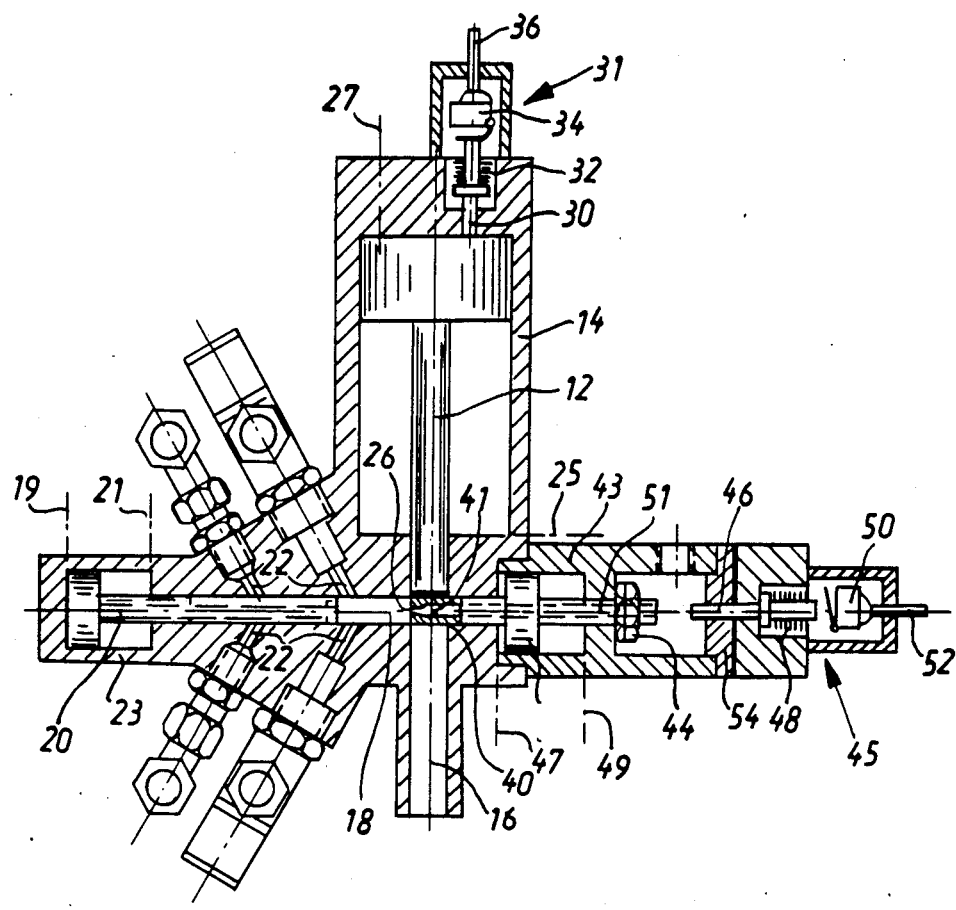
Figure 7:
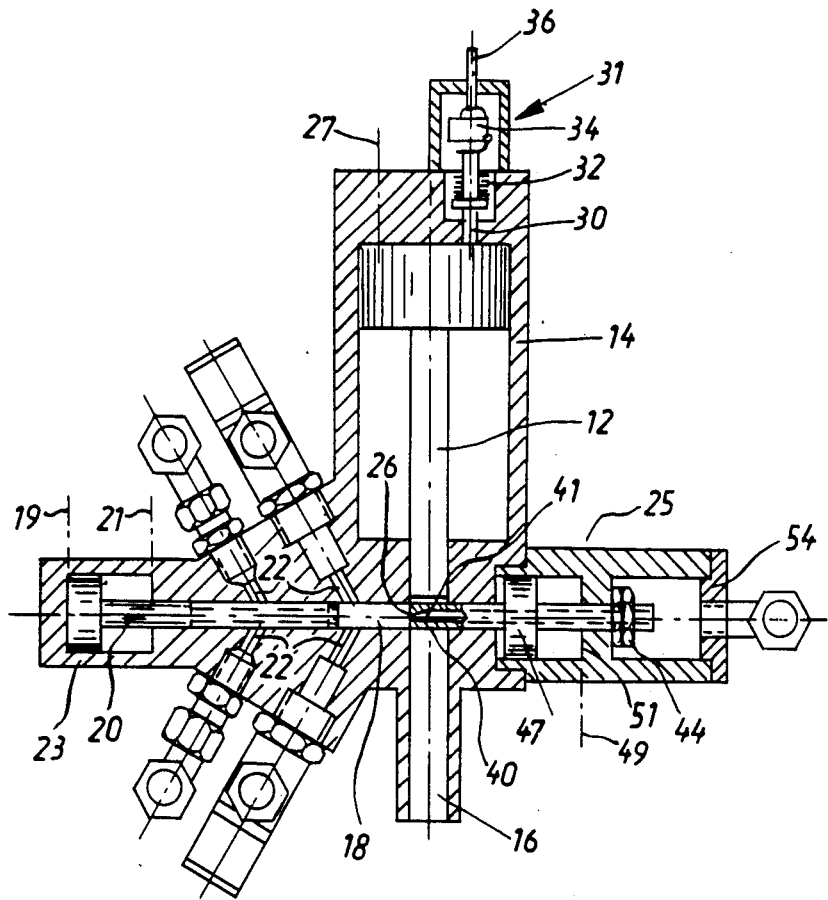

In the embodiment according to FIGS. 5 to 7, the throttling or damping action at the mixing chamber outlet 26 is not brought about by the purging plunger 12, but rather by a separate damping plunger 40 which opposes the mixing chamber outlet 26 and which is mounted for reciprocating movement in the direction of the longitudinal axis of the mixing chamber within the mixing head 10. In the embodiment according to Figures 5 to 7, the damping plunger 40 is adapted to be moved to a point shortly ahead (downstream) of the mixing chamber outlet 26. In this way, the free cross-sectional area of the mixing chamber outlet 26 is restricted, whereby the requisite throttling or damping of the flow of mixture leaving the mixing chamber is effected as a consequence.

The damping plunger 40 is driven by a piston (head) 42 connected thereto, which piston 42 is mounted for longitudinal reciprocating movement in an associated cylinder housing 43 and adapted to be pressurized in double-acting fashion. Pressure is supplied to the piston 42 via hydraulic or similar lines 47, 49 opening into the cylinder housing 43.

Movement of the damping plunger 40 (to a point) in front of the outlet 26 of mixing chamber 18 is limited by a stop 44. The stop 44 is mounted to the portion, extending out from the cylinder housing 43, of a piston rod 51 connected to the piston 42 at the side opposite from the damping plunger 40. In the embodiment shown in FIGS. 5 to 7, the stop is formed by a pair of lock nuts threaded onto the portion of the piston rod 51 which protrudes out from the cylinder housing 43. The stop 44 and the portion of the piston rod 51 outside the cylinder housing 43 are housed within a section formed by an extension of the sidewalls of cylinder housing 43, which section is adapted to be closed by an end cover 54. For changing the position of the stop 44, it is only necessary to remove the end cover 54. The variation of the position of stop 44 and, thus, of the length of travel of the damping plunger 40 can therefore be effected in an extremely easy manner.

In the embodiment of FIGS. 5 to 7, the damping plunger 40 additionally includes a blowing agent nozzle (orifice) 41 which is directed so as to inject into the mixing chamber 18 (FIG. 6).

As shown in FIG. 6, the portion of the piston rod 51 which extends out from the cylinder housing 43 cooperates with a limit switch 45 which has the same construction as limit switch 31. The limit switch 45 includes a switching stud 46 which, against the force of a compression spring 48, may be urged to the right in FIG. 6 by the piston rod 51, thereby operating an electric limit pushbutton or detector 50 which is connected to the electric control device of the overall system through an electric line.

In FIG. 6, the limit switch 45 is mounted to the outer side of the end cover 54, with the switching stud 46 passing through a corresponding hole in the end cover 54.

In the embodiment according to FIGS. 5 to 7, as the throttling or damping function is performed by the damping plunger 40 exclusively, and not by the purging plunger 12, the adjusting piston 28 described in connection with FIGS. 1 to 4 may be omitted.

Alternatively, the stop 44 to limit the length of travel of the damping plunger 40 may be designed such that it can be adjusted or varied in its position from the exterior by means of a screwdriver or the like inserted through a corresponding opening in the end cover 54, without removing the latter.

The limit switch 45 provides for control of the terminal position of the damping plunger 40, such that collision between the damping plunger 40 and the purging plunger 12 is prevented.

Extension and retraction of the damping plunger 40 may occur together with the automatic opening and closing of the blowing agent passage through the blowing agent nozzle 41.

All features disclosed in the papers of application are claimed as being essential to the invention, as far as they are novel over the prior art individually or in any combination with each other.

What we claim is:

1. A high-pressure mixing head for mixing at least two reactive plastics material components for subsequent foaming in a mold, comprising:
   a mixing chamber which has opening thereinto nozzle orifices for introduction of said plastics material components into said mixing chamber;
   a metering plunger closely received and reciprocable within said mixing chamber;
   a mixing chamber outlet;
   a discharge section in flow communication with said mixing chamber and extending approximately normal to said mixing chamber, said discharge section being of greater dimensions than said mixing chamber;
   means for introducing a blowing agent at a location proximate the confluence of said mixing chamber and said discharge section; and
   variable damper means for varying the size of said mixing chamber outlet in flow communication with said discharge section, comprising a free end of a second plunger closely received and reciprocable within said discharge section between a discharge position and a damping position proximate said mixing chamber outlet, and damping position limit stop means positionable at a range of positions for varying the position of said free end in relation to said mixing chamber outlet at said damping position and thereby vary the size of said mixing chamber outlet.

2. A high-pressure mixing head according to claim 1, wherein said damping position limit stop means comprises a cylindrical member threadably engaged with means supporting said second plunger.

3. A high-pressure mixing head according to claim 2 which further comprises an electric limit switch supported by said cylindrical member, said limit switch being positioned to detect the presence of said second plunger at said damping position; and
   said variable damper means for varying the size of said outlet of said mixing chamber in flow communication with said discharge section comprising a throttling plunger reciprocable along the longitudinal axis of said discharge section between a withdrawn position out of said discharge section and a damping position at which said throttling plunger extends into said discharge section and at least partially restricts the size of said mixing chamber outlet in flow communication with said discharge section.

4. A mixing head for two reactive components comprising: means forming: an elongated mixing chamber provided with ports for introducing said components into said mixing chamber, and an outlet opening at one end of said mixing chamber;
   a first plunger shiftable in said mixing chamber between a retracted position in which a mixture of said components is formed therein, and a second position wherein said first plunger is advanced to said opening to drive said mixture from said chamber;
   means forming an elongated quieting channel communicating with said mixing chamber at said opening and having a discharge end;
   a second plunger shiftable in said channel between a retracted position wherein said mixture can be discharged through said channel, and an advanced position wherein said second plunger drives said mixture from said channel; and
   means for positioning at least one end of said second plunger across said opening in said retracted position of said second plunger to partially obstruct flow from said mixing chamber into said channel.

5. The mixing head defined in claim 4, wherein the last mentioned means include adjustment means for varying the degree of obstruction of said opening by said end of said second plunger.

6. The mixing head defined in claim 5, further comprising an effective working piston operatively connected to each of said plungers for displacing same.

7. The mixing head defined in claim 6 wherein said adjustment means include a screw forming an abutment for the working piston of said second plunger.

8. The mixing head defined in claim 7 wherein said screw engages directly a pressurizeable end face of said working piston of said second plunger.

9. A method of operating a mixing head of the type wherein, in an advanced position of a first control plunger the reactive components are circulated through said first plunger, said first plunger is retracted to permit said components to mix in a mixing chamber and discharge from said mixing chamber through an opening at an end thereof into a channel at a right angle to said mixing chamber in a retracted position of a second plunger in said channel, said method comprising:
  disposing a leading end of said second plunger in line with said opening so as to obstruct said opening partially during the flow of the mixture from said chamber to said channel;
  thereafter advancing said first plunger to drive said mixture from said mixing chamber;
  retracting said second plunger to completely clear said opening and permit residues to be discharged from said mixing chamber; and
  advancing said second plunger to drive residues of said mixture from said channel.

10. A mixing head for two reactive components comprising:
  means forming an elongated mixing chamber provided with ports for introducing said components into said mixing chamber, and an outlet opening at one end of said mixing chamber;
  a first plunger shiftable in said mixing chamber between a retracted position in which a mixture of said component is formed therein, and a second position wherein said first plunger is advanced to said opening to drive said mixture from said chamber;
  means forming an elongated quieting passage communicating with said mixing chamber at said opening, said passage having a discharge end remote from said opening;
  a second plunger shiftable in said passage between a retracted position wherein said mixture can be discharged through said passage at said discharge end, and an advanced position wherein said second plunger drives said mixture from said passage; and
  a shiftable abutment for said second plunger establishing said retracted position such that said plunger extends across said opening to partially obstruct flow from said mixing chamber into said passage, and displaceable to enable said second plunger to assume a position in which flow from said outlet is completely unblocked.

* * * * *